Jan. 19, 1965    S. A. ZARLENG    3,166,700
GENERATOR FED MOTOR CONTROL WITH CURRENT LIMIT CIRCUITRY
Filed July 11, 1960
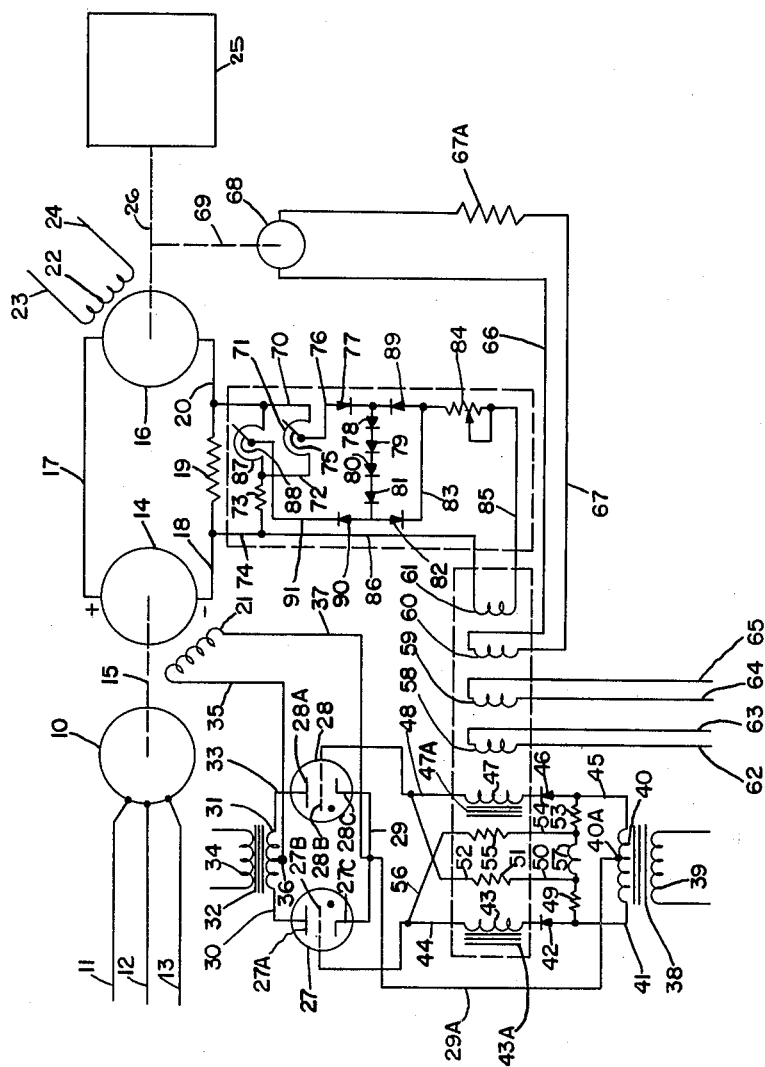
INVENTOR.
STEVE A. ZARLENG
BY
*Charles D Putnam*
ATTORNEY

United States Patent Office 3,166,700
Patented Jan. 19, 1965

3,166,700
GENERATOR FED MOTOR CONTROL WITH CURRENT LIMIT CIRCUITRY
Steve A. Zarleng, Akron, Ohio, assignor to The Clark Controller Company, Cleveland, Ohio, a corporation of Ohio
Filed July 11, 1960, Ser. No. 41,816
15 Claims. (Cl. 318—144)

This invention relates generally to control circuits and more particularly to current limit control circuits for limiting the current flowing through a circuit.

An object of my invention is to provide a current limit control circuit which limits the current flowing in a circuit independent of its direction of flow.

Another object of my invention is to provide a current limit control circuit which does not require an external source of power or reference voltage.

Still another object of my invention is to provide a current limit control circuit where the value at which the current is to be limited may be readily changed.

A further object of the invention is to provide a current limit control circuit where the value at which the current is to be limited may be different for the various directions of current flow.

A still further object of the invention is to provide a current limit control circuit whereby stepless current limiting effect is obtained.

The present invention is directed towards a control circuit for detecting and limiting the flow of excessive current through a load. This is accomplished by connecting an impedance in series with the load so a voltage drop proportional to the load current occurs across it.

The current limiting circuit utilizes a voltage divider connected across the impedance; and has a plurality of series connected rectifiers connected in series with a reactor control winding and an adjustable resistor across the voltage divider. The operation of this circuit is based upon the non-linear forward characteristic of silicon rectifiers. As is known, silicon rectifiers operate with a high forward resistance until a certain voltage is reached. When this value of voltage is reached, the rectifier freely conducts current and this conduction increases in an exponential manner, as illustrated by the equation:

$$I = I_s(10^{17V} - 1)$$

Therefore, as current flow through the impedance increases, an increasing voltage is developed across the voltage divider. When the voltage reaches the critical value, the high forward resistance of the silicon rectifiers rapidly decreases allowing them to freely conduct current. This current flows through the rectifiers, the adjustable resistor, and the reactor control winding.

The reactor control winding is associated with a reactor which controls the output of a power converter; and thereby controls the amount of current flowing to the load and through the impedance. When no current is flowing through this reactor control winding, the output of the converter and the value of current flowing to the load is controlled by other reactor control windings. When the load current reaches the predetermined value and causes the current limit circuit to become conductive, its reactor control winding is energized and reduces the output of the power converter to limit the value of load current to the predetermined value.

Another embodiment of my invention is to connect a second voltage divider across the impedance in parallel with the first voltage divider. The same reactor control winding is connected across it through silicon rectifiers. In this instance, the rectifiers are connected to allow current flow through the reactor winding in the reverse direction. The silicon rectifiers are connected in a rectifier bridge for purposes of economy.

This embodiment of the circuit provides for both positive and negative input signals so the load current may be limited regardless of its direction of flow.

Other objects and a fuller understanding of my invention may be had by referring to the following description and claims when taken in conjunction with the accompanying drawing.

With reference to the drawing, there is shown at 10 an A.C. motor connected to be energized through A.C. supply lines 11, 12 and 13 so as to run at a substantially constant speed. Motor 10 is connected to drive a D.C. generator 14 by a drive shaft shown as dotted line 15.

The output of generator 14 is connected to one terminal of a D.C. motor 16 by a wire 17 and to the other terminal by a wire 18, a resistor 19 and a wire 20.

Generator 14 has a field winding 21 which is variably energized to vary the output of generator 14 and thereby control the speed of motor 16.

Motor 16 has a field winding 22 which is connected by lines 23 and 24 to a suitable source of constant D.C. voltage.

Motor 16 is connected to drive a mill or other type of mechanical device, indicated generally at 25, by a drive shaft shown as dotted line 26.

The power converting system comprises the means for variably energizing field winding 21. The power converter consists of two thyratrons 27 and 28 which are fired repetitively in alternating half cycles. Thyratron 27 has an anode 27A, a control grid 27B and a cathode 27C. Thyratron 28 has an anode 28A, a control grid 28B and a cathode 28C. The cathodes 27C and 28C are connected together by a wire 29. Anodes 27A and 28A are connected together by a wire 30, a secondary winding 31 of a transformer 32 and a wire 33. Transformer 32 has a primary winding 34 which is connected to a suitable source of alternating current.

Field winding 21 has one side connected by a wire 35 to a center tap 36 on secondary winding 31. The other side of field winding 21 is connected by a wire 37 to wire 29.

Therefore, in the half cycle that tube 27 is conducting, current will flow through secondary winding 31, wire 30, tube 27, wire 29 and wire 37 to field winding 21; and back through wire 35 to the center tap 36 on secondary winding 31.

In the other half cycle, tube 28 will be conducting and current will flow from secondary winding 31 through wire 33, tube 28, wire 29 and wire 37 to field winding 21; and back through wire 35 to the center tap 36 on secondary winding 31.

The amount of current flowing through this path will be dependent upon the time in the respective half cycles that tubes 27 and 28 are made conductive. The method chosen for controlling the conduction time of a tube during its conducting half cycle is by switching the polarity of the voltage on its control grid; and which is the subject matter of my patent application bearing Serial Number 803,189, filed on May 31, 1959, and having the same assignee as the instant invention.

The polarity switching circuit consists of a transformer 38 having a primary winding 39 connected to a suitable source of alternating current power and a secondary winding 40. Secondary winding 40 has one side connected by a wire 41, a rectifier 42, a reactor winding 43 and a wire 44 to control grid 27B of tube 27. Rectifier 42 is connected so current can flow through this circuit only during the half cycle the side of secondary winding 40 connected to wire 41 is positive with respect to the opposite side.

Reactor winding 43 is wound on a reactor core 43A.

The other side of secondary winding 40 is connected by a wire 45, a rectifier 46, a reactor winding 47 and a wire 48 to control grid 28B of thyratron 28. Rectifier 46 is connected so current can flow through this circuit only during the half cycle the side of secondary winding 40 connected to wire 45 is positive with respect to the side connected to wire 41.

Reactor winding 47 is wound on a reactor core 47A.

Wire 41 is connected by a resistor 49, a wire 50, a resistor 51 and a wire 52 to wire 48 which provides a current flow path from wire 48 to the side of secondary winding 40 that is connected to wire 41.

Wire 45 is connected by a resistor 53, a wire 54, a resistor 55 and a wire 56 to wire 44 which provides a current flow path from wire 44 to the side of secondary winding 40 that is connected to wire 45.

Wires 50 and 54 are connected together by a reactor winding 57.

Wire 29A connects wire 29 to the center tap 40A on secondary 40.

Control windings 58, 59, 60 and 61 are wound on both reactor cores 43A and 47A. The purpose of these control windings and the connections thereto will be described in more detail hereinafter.

Control winding 58 is a bias winding and connected by wires 62 and 63 to a suitable source of direct current power so that current flowing through it produces flux in reactor cores 43A and 47A opposite to that flux produced in the respective cores by the current flowing in windings 43 and 47.

Control winding 59 is connected by wires 64 and 65 to a suitable accelerating and decelerating control circuit such as the timing and amplifier circuit as is described in my co-pending application U.S. Patent Office Serial No. 41,828, filed July 11, 1960 and now U.S. Patent No. 3,019,379.

Control winding 60 is connected by a wire 66, a wire 67 and a resistor 67A to the output of a tachometer generator 68. Tachometer generator 68 is driven at the same speed as motor 16 since it is connected by a shaft 69 to shaft 26. Thus, the voltage output of tachometer generator 68 is in direct proportion to the speed of motor 16.

The flow of current through control winding 60 from tachometer generator 68 is in a direction to produce flux in reactor cores 43A and 47A opposite to that flux produced in the respective cores by the current flowing in windings 43 and 47.

It is desirable to control the current flowing in the armature circuit of motor 16 and generator 14 so that it does not exceed an unsafe value. Further, it is desired to maintain this current below the unsafe value regardless whether the motor is driving a load, whether it is accelerating, or whether it is decelerating. This is accomplished as follows.

A current limit circuit is connected across resistor 19 in the motor-generator armature circuit. During starting or while running, current flows from generator 14 through wire 17, motor 16, wire 20, resistor 19 and wire 18 to generator 14. Current flowing in this circuit produces a voltage across resistor 19.

A voltage divider is connected across resistor 19; and due to the voltage, current flows through it from wire 20 through a wire 70, a potentiometer 71, a wire 72, a resistor 73 and a wire 74 to wire 18. A slider 75 on potentiometer 71 is made adjustable so the value at which the current is to be limited may be varied.

Slider 75 is connected through a wire 76, a rectifier 77, 78, 79, 80, 81 and 82, a wire 83, a resistor 84, and a wire 85 to control winding 61; and back through a wire 86 and wire 74 to wire 18.

As before mentioned, the operation of this circuit is based upon the non-linear forward characteristic of silicon rectifiers. As is well known, individual silicon rectifiers have a very high forward resistance until a magnitude of approximately .7 volt is reached across it. When this voltage is exceeded, the rectifier rapidly becomes conductive. When more than one rectifier is connected in series, the breakdown characteristic of each of the individual rectifiers are added together; and with the aforementioned six rectifiers in series, a total breakdown voltage of approximately 4.2 volts is achieved. That is, until a potential of at least 4.2 volts is reached on slider 75, very little current will flow through the series connected rectifiers and control winding 61. Upon reaching this potential, current will flow freely through this circuit to energize control winding 61 in a direction to produce a flux in reactor cores 43A and 47A opposite to the flux produced therein by the current flowing through windings 43 and 47.

When motor 16 is decelerating, it acts as a generator and feeds current back to generator 14. Thus, the armature current flow is the reverse of the aforedescribed direction.

A second potentiometer 87 is connected in parallel with potentiometer 71 and now the current flows through wire 74, resistor 73, wire 72, potentiometer 87 and wire 70 to wire 20. Potentiometer 87 has an adjustable slider 88 thereon so the value at which the current to be limited may be varied.

Wire 18 is connected to slider 88 through wire 74, wire 86, control winding 61, wire 85, resistor 84, through rectifiers 89, 78, 79, 80, 81 and 90, and through wire 91 to slider 88 on potentiometer 87.

Again, six rectifiers are connected in series making the breakdown voltage approximately 4.2 volts. As before, when the 4.2 value of voltage is reached, large currents will flow through control winding 61. However, in this instance, its direction is the reverse from before so that control winding 61 now produces flux in reactor cores 43A and 47A in the same direction as that produced by the current flowing in windings 43 and 47.

It is to be noted that the silicon rectifiers are connected in a bridge arrangement so that four of them are utilized regardless of whether the circuit is limiting the current during the period of acceleration or decelartion.

Resistor 84 is adjustable and connected in series with control winding 61 so that the slope of the resulting control characteristic can be adjusted and changed.

The current limit circuit is entirely passive in nature; that is, it does not require the use of additional power supply or any auxiliary equipment. All of the power necessary for activating control winding 61 is obtained directly from the input; in this instance, the armature circuit of motor 16 and generator 14. This makes the circuit very practical inasmuch as no power amplification is necessary and since in most applications where such a circuit is used, a very low impedance high power source is readily available.

The basic purpose of this circuit is to serve as a protective device by detecting presence of any excess current in the circuit which might be damaging to the machinery.

The setting of the sliders 75 and 88 on potentiometers 71 and 87 are independent from each other. Therefore, it is possible to make the accelerating current limit value different from that of the decelerating current limit value.

*Operation*

In the aforementioned co-pending application bearing Serial Number 803,189, filed on May 31, 1959, it is described how the polarity switching circuit controls the conduction time of tubes 27 and 28; which briefly is as follows.

During the half cycle wire 30 is positive, so tube 27 can be made conductive, wire 41 is also positive. In this half cycle, current will start to flow through rectifier 42 and winding 43. However, reactor core 43A is not saturated at the start of the half cycle due to the flux produced therein by the current flow in control windings 58, 59, 60 and 61. Thus, winding 43 presents an extremely high impedance to this flow of current keeping its value small. This causes substantially all of the voltage from secondary 40 to appear across winding 43 at the start of this half cycle and maintains wire 44 at substantially the same polarity as wire 45.

As this small current flows through winding 43, it produces a flux in reactor core 43A, whereby reactor core 43A becomes saturated at some instant during this half cycle.

When saturation occurs, the impedance of winding 43 is reduced to a very small value switching the polarity at wire 44 to substantially the same as that of wire 41. Most of the voltage from secondary 40 now appears substantially across resistors 53 and 55. Therefore, it is seen that the polarity on wire 44, which is connected to control grid 27B, is switched from a negative polarity to a posiive polarity; and tube 27 is thereby allowed to become conductive.

The time in the half cycle that conduction starts determines the amount of current supplied to the load. It is well known that tubes of this type continue to conduct current until the end of the half cycle, once conduction is initiated. Therefore, it is seen that the time in the half cycle that reactor core 43A saturates controls the amount of current supplied to the load.

As described, reactor core 43A is caused to become saturated by current flowing through winding 43. The time required for this to occur depends upon the level of flux in reactor core 43A at the start of this half cycle. This level of flux depends solely upon the degree of energization of control windings 58, 59, 60 and 61.

In the half cycle tube 28 is conductive, no current can flow through winding 43 because of rectifier 42. Therefore, the only flux produced in reactor core 43A in this half cycle will be due to the current flowing in control windings 58, 59, 60 and 61. This presets the flux level in reactor core 43A for the next half cycle.

It is obvious that the same action occurs in the other half of the cycle with respect to winding 47 and reactor core 47A to control the conduction of tube 28. Therefore, for the sake of brevity, the description of operation for this half cycle will not be made.

To cause motor 16 to accelerate, control winding 59 is energized with a larger current so as to raise the flux level in reactor cores 43A and 47A. This causes tubes 27 and 28 to start conducting current earlier in their respective half cycles to conduct more current to field winding 21. The increased energization of field winding 21 causes the output of generator 14 to be increased and motor 16 therefore speeds up.

Also, the application of a load or an additional load to motor 16 reacts similarly to the motor's acceleration inasmuch as it causes the current supplied to the motor to be increased. This is accomplished as follows.

The application of the load or an additional load causes motor 16 to slow down. This reduces the output of tachometer generator 68 and its energization of control winding 60. The decreased energization of control winding 60 permits the flux level in reactor cores 43A and 47A to be raised and increases the period in the respective half cycles that tubes 27 and 28 conduct current. This increases the energization of field winding 21 to cause output of generator 14 to be increased and supply more current to motor 16 so it comes back up to the proper speed.

During acceleration or stable operating periods, some of the current from generator 14 flows through wire 70, potentiometer 17, wire 72, resistor 73 and wire 74. The amount of current flow in this path is proportional to the total current flowing.

The slider 75 of potentiometer 71 is preset whereby, when the maximum safe current is flowing through the armature current, a voltage of 4.2 volts is produced across slider 75 and wire 74.

When a voltage of less than 4.2 volts is across slider 75 and wire 74, very little current flows through the six series connected silicon rectifiers and control winding 61. This is because of the aforedescribed high forward resistance characteristic of the rectifiers.

When the current in the armature circuit reaches its maximum safe value, a voltage of 4.2 volts is developed across slider 75 and wire 74. This causes the rectifiers to start conducting large amounts of current which flows from slider 75 through the aforedescribed current flow path containing rectifiers 77, 78, 79, 80, 81 and 82, and control winding 61.

This current flowing through control winding 61 is in a direction to produce in reactor cores 43A and 47A flux opposite to that produced by the current flowing in reactor windings 43 and 47 and control winding 59. Therefore, current flowing in control winding 61 decreases the present flux level so tubes 27 and 28 are made conductive later in their conducting half cycle. This reduces the energization of field winding 21 and reduces the output of generator 14. Thus, the current flowing in the armature circuit of motor 16 is prevented from increasing further and is limited to its maximum safe value.

The current flowing through control winding 16 is obtained directly from the current in the armature circuit. Therefore, if due to any reason the current in the armature circuit should be increased, a proportionally increased current will flow through control winding 61 to further reduce the output of tubes 27 and 28; and maintain the current limited to its safe value.

Current limit protection is also provided while the motor is decelerating as follows.

The energization of control winding 59 is reduced to decrease the present flux level, reducing the output of tubes 27 and 28 and the output of generator 14. When the flux level is reduced, the counter E.M.F. of motor 16 causes current to flow in the reverse direction through the armature circuit and motor 16 acts as the generator. This current flow is from motor 16 through wire 17 to generator 14 and back through wire 18, resistor 19 and wire 20 to motor 16.

This current flow causes current to flow from wire 18, through wire 74, resistor 73, wire 72, potentiometer 87 and wire 70 to wire 20. Potentiometer 87 is connected in parallel with potentiometer 71 across wires 72 and 70.

Slider 88 of potentiometer 87 is set so when the maximum safe current in the armature circuit is reached, a potential of 4.2 volts is developed across slider 88 and wire 74. Until this voltage is reached, very little current flows through control winding 61 and the six series connected rectifiers.

When the voltage is reached, the rectifiers rapidly become increasingly conductive and large current flows through the aforedescribed current path containing control winding 61 and rectifiers 89, 78, 79, 80, 81 and 90.

It is to be noted that this current flow through control winding 61 is the reverse from that described before. Therefore, it produces a flux in reactor cores 43A and 47A to aid that produced by the current flowing in windings 43 and 47 and control winding 59. This raises the preset flux level so tubes 27 and 28 become conductive earlier in the half cycle and conduct more current to increase the energization of field winding 21. Thereby, the output of generator 14 is increased to decrease the difference between it and the counter E.M.F. of motor 16 and thus prevent any further increase of current.

When all or some of the load is removed from motor 16, it tends to speed up. This increase of speed causes the output of tachometer generator 68 to be increased. It energizes control winding 60 with increased energization and thereby reduces the flux level in reactor cores 43A and 47A. As before described, this causes the output of generator 14 to be reduced and allow motor 16 to slow down. Motor 16 will then decelerate in the same manner as just described.

It is to be noted that potentiometer 71 is used for acceleration and potentiometer 87 is used for deceleration.

This is done so a different current limit value can be used during acceleration than is used during deceleration.

Further, it is to be noted that the rectifiers are connected as a rectifier bridge so four rectifiers can be used for both acceleration and deceleration control.

I claim:

1. An electrical circuit for detecting the flow of excess load current through a load circuit independent of the direction of current flow through said load circuit comprising an impedance connected in said load circuit, a first and second voltage divider connected across said impedance, rectifying means for separately connecting said first and second voltage divider to an output, said rectifying means connected in a manner to prevent the flow of current from either said first or second voltage divider to said output until load current reaches a predetermined value whereby said rectifying means allows current to flow from either said first or second voltage divider to said output to produce a positive or negative output dependent upon the direction of load current flow.

2. An electrical circuit as described in claim 1 wherein the first and second voltage dividers are independently adjustable so the value of load current at which the rectifying means allows current to flow from said first or second voltage divider to said output can be different for the different directions of load current flow.

3. An electrical circuit as described in claim 1 wherein the rectifying means comprises a plurality of rectifiers connected in a rectifying bridge having some rectifiers connected in the center leg thereof whereby said some rectifiers are always opposed to the flow of current from either said first or second voltage divider to said output regardless of the direction of flow of said load circuit.

4. In an electrical system having a controllable power converter for supplying power to and receiving power from a load and having an impedance in series therewith, control means for controlling said converter, a current limit circuit comprising a first voltage divider connected to be energized by the voltage drop in said impedance when current flows in one direction, a second voltage divider connected to be energized by the voltage drop in said impedance when current flows in the other direction, a plurality of rectifiers electrically connecting said first voltage divider to said control means in a manner to prevent the flow of current therethrough until the current flowing through said impedance in said one direction reaches a predetermined value and then to allow current flow so said converter is controlled in one sense, said plurality of rectifiers electrically connecting said second voltage divider to said control means in a manner to prevent the flow of current therethrough until the current flowing through said impedance in said other direction reaches a predetermined value and then to allow current flow so said converter is controlled in an opposite sense.

5. An electrical system as described in claim 4 wherein the first and second voltage dividers are independently adjustable so the predetermined values of current flow through said impedance at which the control means controls said converter can be different for the different directions of current flow.

6. An electrical system as described in claim 4 wherein the plurality of rectifiers are connected in a rectifier bridge having some rectifiers connected in a center leg thereof.

7. In an electrical system having a controllable power converter for controlling the flow of current between a second source and a load which has an impedance connected in series therewith, control means for controlling said converter, a current limit circuit comprising a first voltage divider connected to be energized by the voltage drop in said impedance when current flows in one direction, a second voltage divider connected to be energized by the voltage drop in said impedance when current flows in the other direction, a plurality of rectifiers electrically connecting said first voltage divider to said control means in a manner to prevent the flow of current therethrough until the current flow through said impedance in said one direction reaches a predetermined level and then to allow current flow so the converter controls said second source in one sense, said plurality of rectifiers electrically connecting said second voltage divider to said control means in a manner to prevent the flow of current therethrough until the current flow through said impedance in said other direction reaches a predetermined level and then to allow current flow so the converter controls said second source in an opposite sense.

8. An electrical system as described in claim 7 wherein the first and second voltage dividers are independently adjustable so the predetermined levels of current flow at which the control means controls said converter can be different for the different directions of current flow.

9. An electrical system as described in claim 7 wherein the plurality of rectifiers are connected in a rectifier bridge having some of the rectifiers connected in the center leg thereof.

10. In an electrical system having a controllable power converter supplying power to the field of a generator, the armature of which is connected to a load, and wherein an impedance is connected in series with the generator armature and the load, control means for controlling said converter, a current limit circuit comprising a first voltage divider connected to be energized by the voltage drop in said impedance when current flows in one direction, a second voltage divider connected to be energized by the voltage drop in said impedance when current flows in the other direction, a plurality of rectifiers electrically connecting the first voltage divider to the control means in a manner to prevent the flow of current therethrough until the current flow through said impedance in said one direction reaches a predetermined level and then to allow current flow therethrough to control the armature current in one sense, said plurality of rectifiers electrically connecting said second voltage divider to the control means in a manner to prevent the flow of current therethrough until the current flow through said impedance in said other direction reaches a predetermined level and then to allow current flow therethrough to control the armature current in an opposite sense.

11. An electrical system as described in claim 10 wherein the first and second voltage dividers are independently adjustable so the predetermined value of current flow at which the armature current is controlled can be different for the different directions of current flow.

12. An electrical system as described in claim 10 wherein the plurality of rectifiers are connected in a rectifier bridge having some of the rectifiers connected in the center leg thereof.

13. In an electrical system having a controllable power converter supplying power to the field of a generator, the armature of which is connected to the armature of a motor, an impedance connected in series with the two armatures, control means for controlling the converter, a current limit circuit comprising a first voltage divider connected to be energized by the voltage drop in said impedance when current is flowing from the generator to the motor, a second voltage divider connected to be energized by the voltage drop in said impedance when current is flowing from the motor to the generator, a plurality of rectifiers electrically connecting said first voltage divider to said control means in a manner to prevent the flow of current therethrough until the current flow through said impedance from said generator to said motor has reached a predetermined value and then to allow current flow therethrough to decrease the output current from said generator, said plurality of rectifiers electrically connecting said second voltage divider to said control means in a manner to prevent the flow of current therethrough until the current flowing from said motor to said generator has reached a predetermined value and then to allow current flow therethrough to increase the output current from said generator.

14. An electrical system as described in claim 13 wherein the first and second voltage dividers are independently adjustable so the predetermined value of current flow to the motor can be different than the predetermined value of current flow from the motor.

15. An electrical system as described in claim 13 wherein the plurality of rectifiers are connected in a rectifier bridge having some of said rectifiers in the center leg thereof.

References Cited by the Examiner

UNITED STATES PATENTS

| | | | |
|---|---|---|---|
| 2,516,599 | 7/50 | Shaw et al. | 318—144 |
| 2,554,695 | 5/51 | Brown | 318—144 X |
| 2,659,040 | 11/53 | Halter | 318—144 X |
| 2,677,085 | 4/54 | Sikorra | 318—317 X |
| 2,749,493 | 6/56 | Fischer | 318—144 X |
| 2,753,516 | 7/56 | Halter et al. | 318—144 X |
| 2,929,983 | 3/60 | Abell | 322—79 X |

FOREIGN PATENTS

| | | |
|---|---|---|
| 356,807 | 9/31 | Great Britain. |
| 605,457 | 11/34 | Germany. |
| 731,809 | 6/55 | Great Britain. |
| 835,404 | 5/60 | Great Britain. |

ORIS L. RADER, *Primary Examiner.*

MILTON O. HIRSHFIELD, *Examiner.*